(12) United States Patent
Hoshino et al.

(10) Patent No.: US 10,801,526 B2
(45) Date of Patent: Oct. 13, 2020

(54) SEALING DEVICE

(71) Applicants: Komatsu Ltd., Tokyo (JP); NOK Corporation, Tokyo (JP)

(72) Inventors: Yoshio Hoshino, Tokyo (JP); Hisatoshi Odaka, Tokyo (JP); Kenichi Ajiki, Kitaibaraki (JP); Takafumi Nakamura, Kitaibaraki (JP); Yoshiyuki Abe, Mito (JP)

(73) Assignees: KOMATSU LTD., Tokyo (JP); NOK CORPORATION, Tokyo (JP)

( * ) Notice: Subject to any disclaimer, the term of this patent is extended or adjusted under 35 U.S.C. 154(b) by 0 days.

(21) Appl. No.: 16/250,263

(22) Filed: Jan. 17, 2019

(65) Prior Publication Data

US 2020/0200197 A1 Jun. 25, 2020

(30) Foreign Application Priority Data

Dec. 19, 2018 (JP) ................. 2018-237721

(51) Int. Cl.
  *F15B 15/14* (2006.01)
  *F16J 15/3204* (2016.01)
(52) U.S. Cl.
  CPC ....... *F15B 15/1461* (2013.01); *F16J 15/3204* (2013.01)

(58) Field of Classification Search
  CPC ............... F15B 15/1461; F16J 15/3268; F16J 15/3276; F16J 15/3204
  See application file for complete search history.

(56) References Cited

U.S. PATENT DOCUMENTS

| | | | | |
|---|---|---|---|---|
| 3,003,799 A | * | 10/1961 | Marchionda | F16J 15/3204 277/567 |
| 3,738,669 A | * | 6/1973 | Andersen | F16J 15/3272 277/546 |
| 4,099,798 A | * | 7/1978 | Steinmetz | B23Q 11/0875 15/236.01 |
| 2015/0247514 A1 | * | 9/2015 | Isobe | F15B 15/1428 92/5 R |

FOREIGN PATENT DOCUMENTS

JP  2013024302 A  *  2/2013
JP  2013-224732 A     10/2013

* cited by examiner

*Primary Examiner* — Thomas E Lazo
(74) *Attorney, Agent, or Firm* — Locke Lord LLP

(57) ABSTRACT

A sealing device includes: an annular seal that is disposed on an outer periphery of a rod of a hydraulic cylinder further on a side of an extending direction than a cylinder head of the hydraulic cylinder and that has a pair of opposing first facing surfaces; a holding member disposed on an outer periphery of the seal; and a fixing member disposed on an outer periphery of the holding member, the fixing member having a tapered inner surface that contacts an outer surface of the holding member and that has an inner diameter increasing toward a retracting direction.

18 Claims, 12 Drawing Sheets

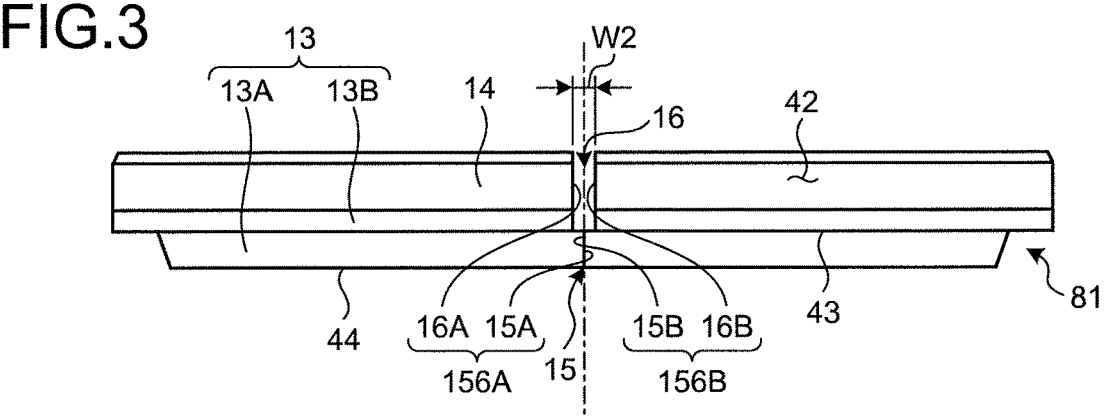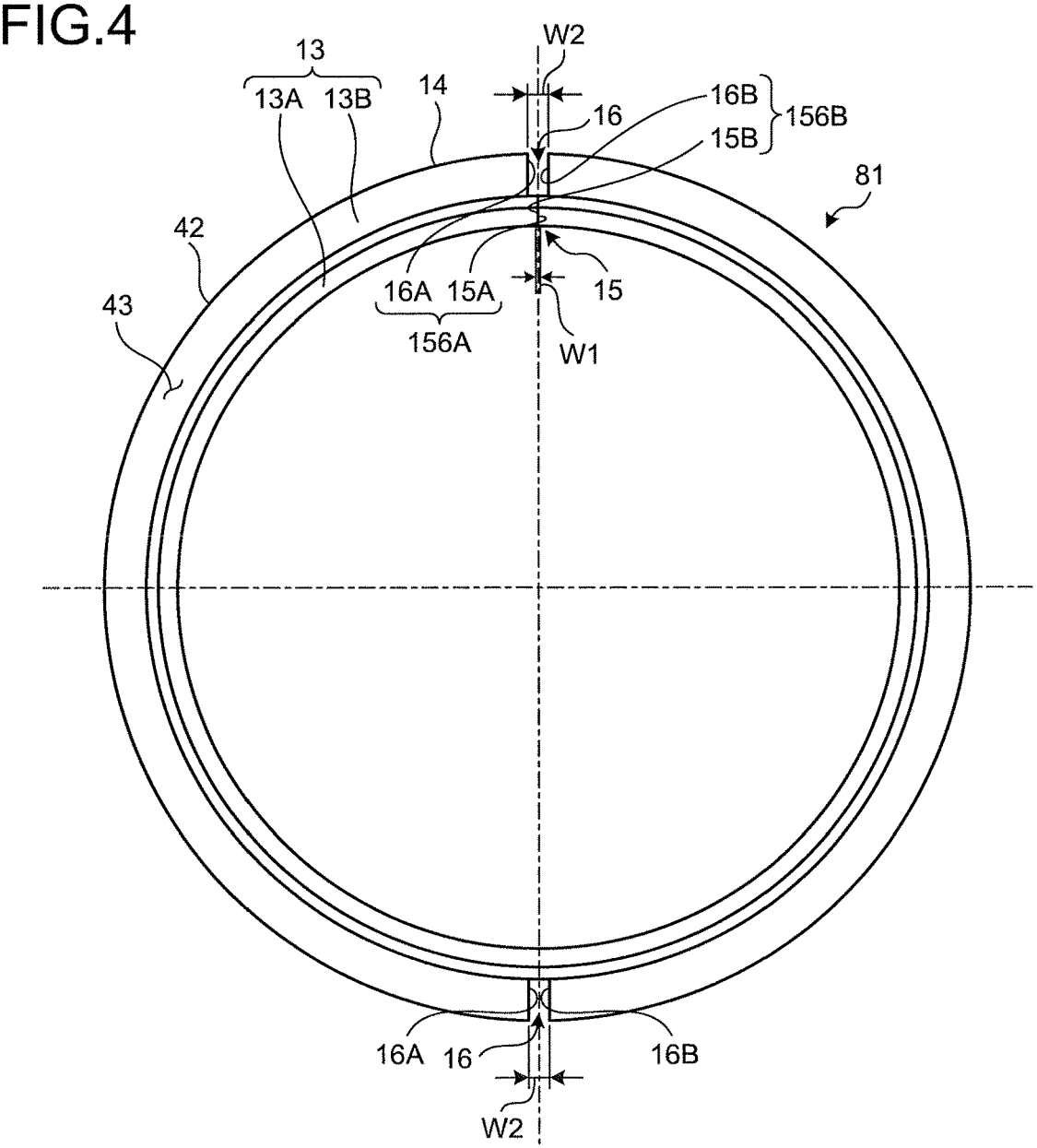

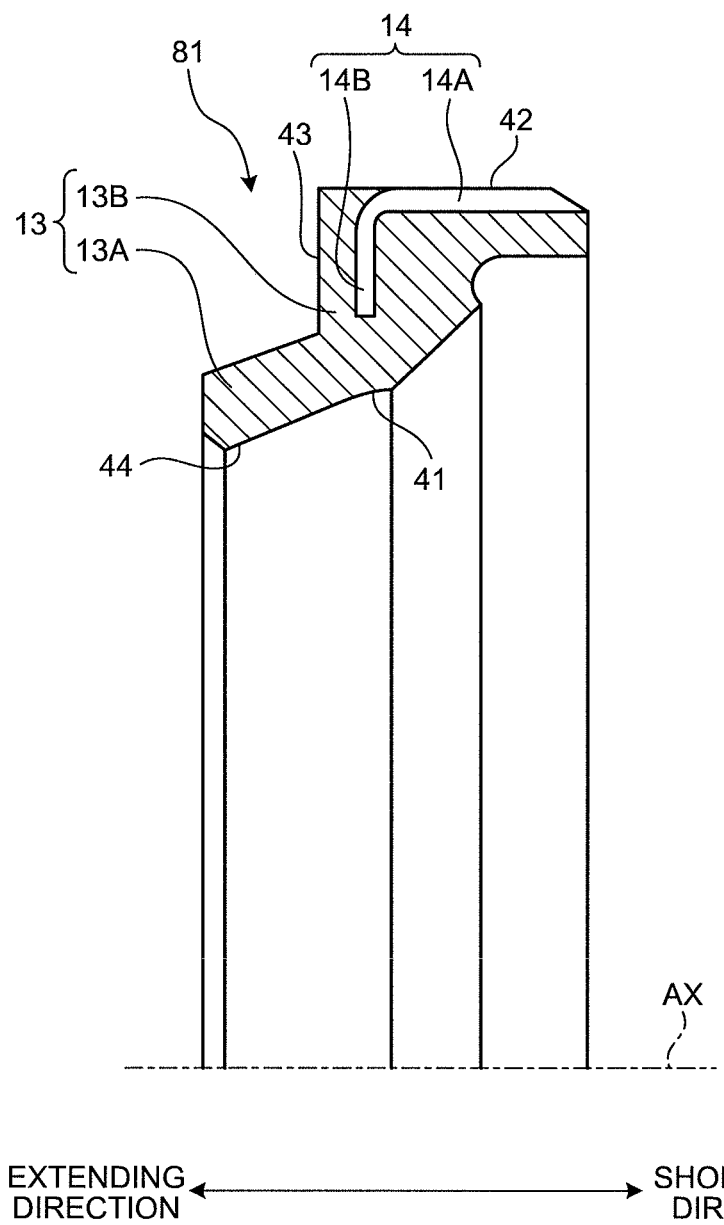

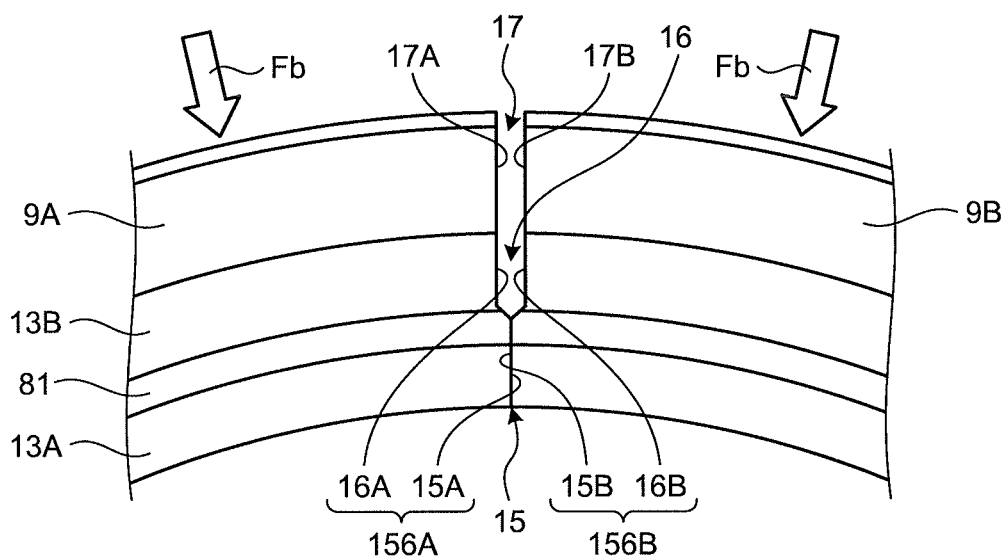
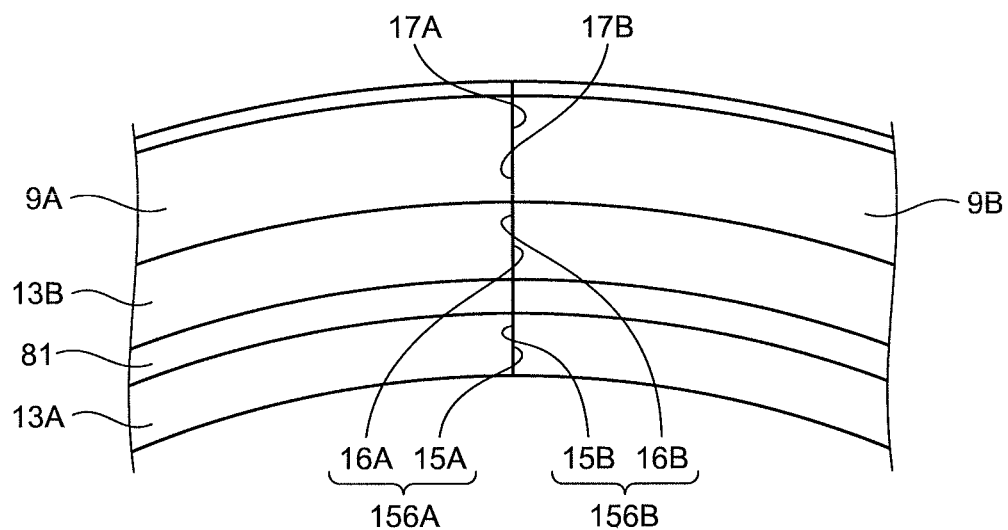

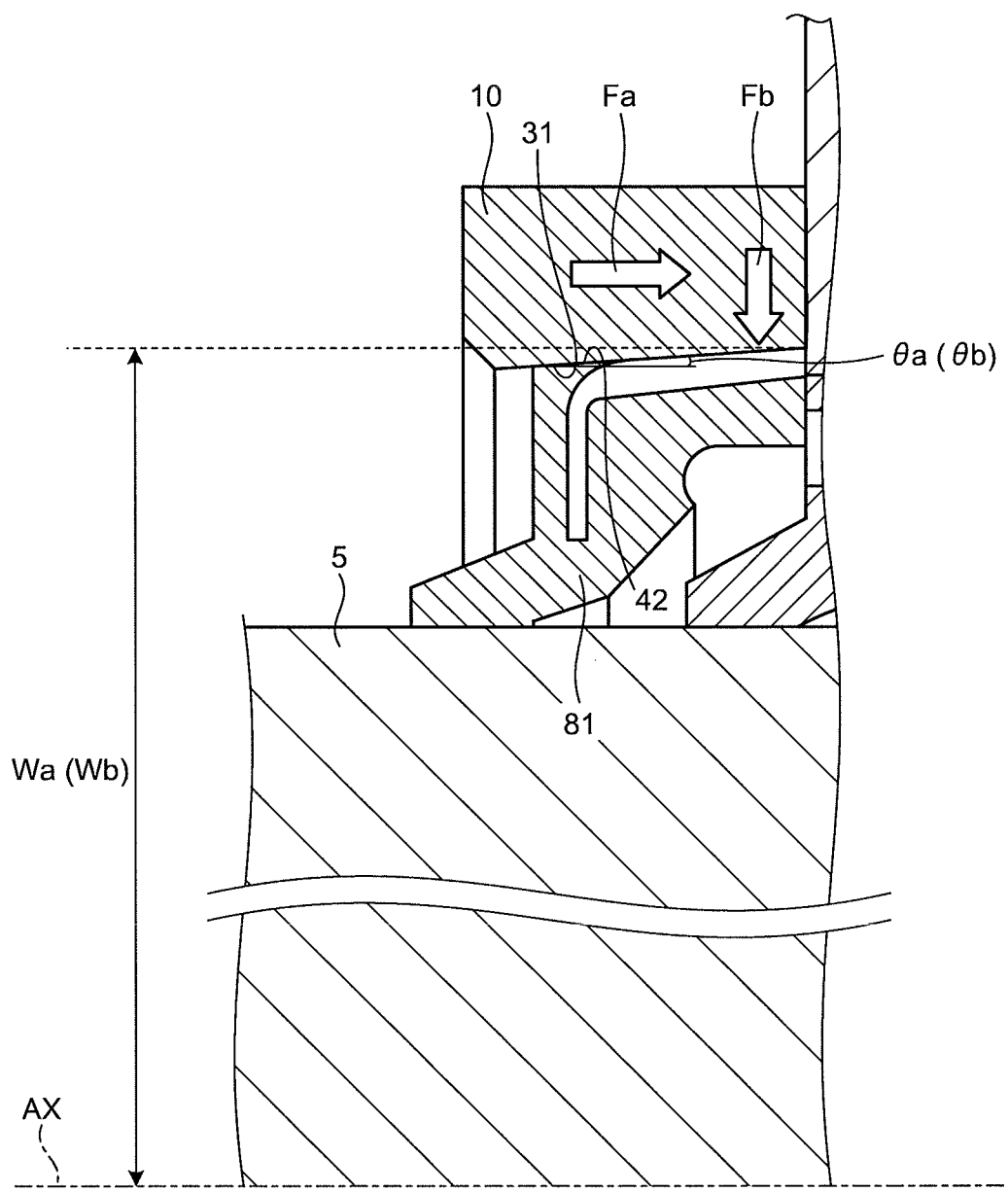

SEALING DEVICE

CROSS-REFERENCE TO RELATED APPLICATION(S)

The present application claims priority to and incorporates by reference the entire contents of Japanese Patent Application No. 2018-237721 filed in Japan on Dec. 19, 2018.

BACKGROUND OF THE INVENTION

1. Field of the Invention

The present disclosure relates to a sealing device for a hydraulic cylinder.

2. Description of the Related Art

Construction machines include working equipment and hydraulic cylinders that extend and shorten to operate the working equipment. The hydraulic cylinder has a sealing device for sealing the boundary between a cylinder head and a rod of the hydraulic cylinder. The sealing device prevents hydraulic oil in the internal space of the hydraulic cylinder from leaking to the external space of the hydraulic cylinder, and foreign substances in the external space of the hydraulic cylinder from entering the internal space of the hydraulic cylinder. JP 2013-224732 A discloses one example of a dust seal for preventing foreign substances in the external space of the hydraulic cylinder from entering the internal space of the hydraulic cylinder.

Dust seals frequently contact foreign substances, and thus are easily deteriorated. When a dust seal is deteriorated, the dust seal is replaced with a new one. When dust seals are frequently replaced, long time needed for replacement operation lowers the operation rate of a construction machine equipped with a hydraulic cylinder. A technique for replacing a dust seal in a short time is thus needed.

An object of the disclosure is to provide a sealing device whose seal such as the dust seal can be replaced in a short time.

SUMMARY OF THE INVENTION

According to the disclosure, a sealing device comprises: an annular seal that is disposed on an outer periphery of a rod of a hydraulic cylinder further on a side of an extending direction than a cylinder head of the hydraulic cylinder and that has a pair of opposing first facing surfaces; a holding member disposed on an outer periphery of the seal; and a fixing member disposed on an outer periphery of the holding member, the fixing member having a tapered inner surface that contacts an outer surface of the holding member and that has an inner diameter increasing toward a retracting direction.

According to the disclosure, a seal can be replaced in a short time.

BRIEF DESCRIPTION OF THE DRAWINGS

FIG. 3 is a plan view illustrating a dust seal according to the embodiment;

FIG. 4 is a front view illustrating the dust seal according to the embodiment;

FIG. 5 is a cross-sectional view illustrating the dust seal according to the embodiment;

FIG. 13 is a front view illustrating parts of the dust seal and the holding member according to the embodiment;

FIG. 14 is a front view illustrating the parts of the dust seal and the holding member according to the embodiment; and FIG. 15 is an enlarged cross-sectional view of a part of a sealing device according to an embodiment.

DETAILED DESCRIPTION OF THE PREFERRED EMBODIMENTS

An embodiment of the disclosure will now be described with reference to the drawings, but the disclosure is not limited to the embodiment. Components in the embodiment described below can be appropriately combined. In addition, some components are not used in some cases.

Hydraulic Cylinder

Figure 1:
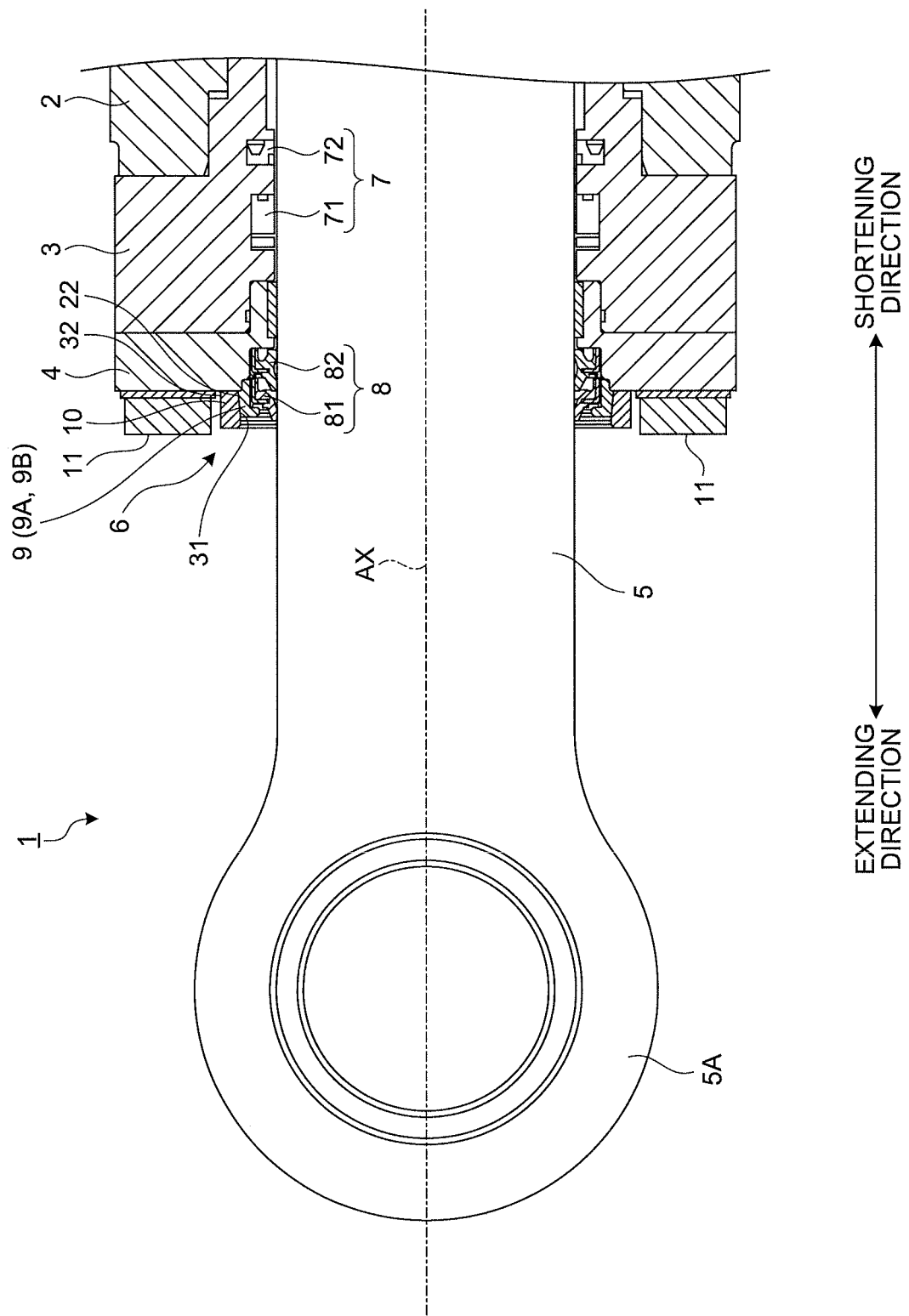
FIG. 1 is a cross-sectional view illustrating a part of a hydraulic cylinder according to an embodiment.
Figure 2:
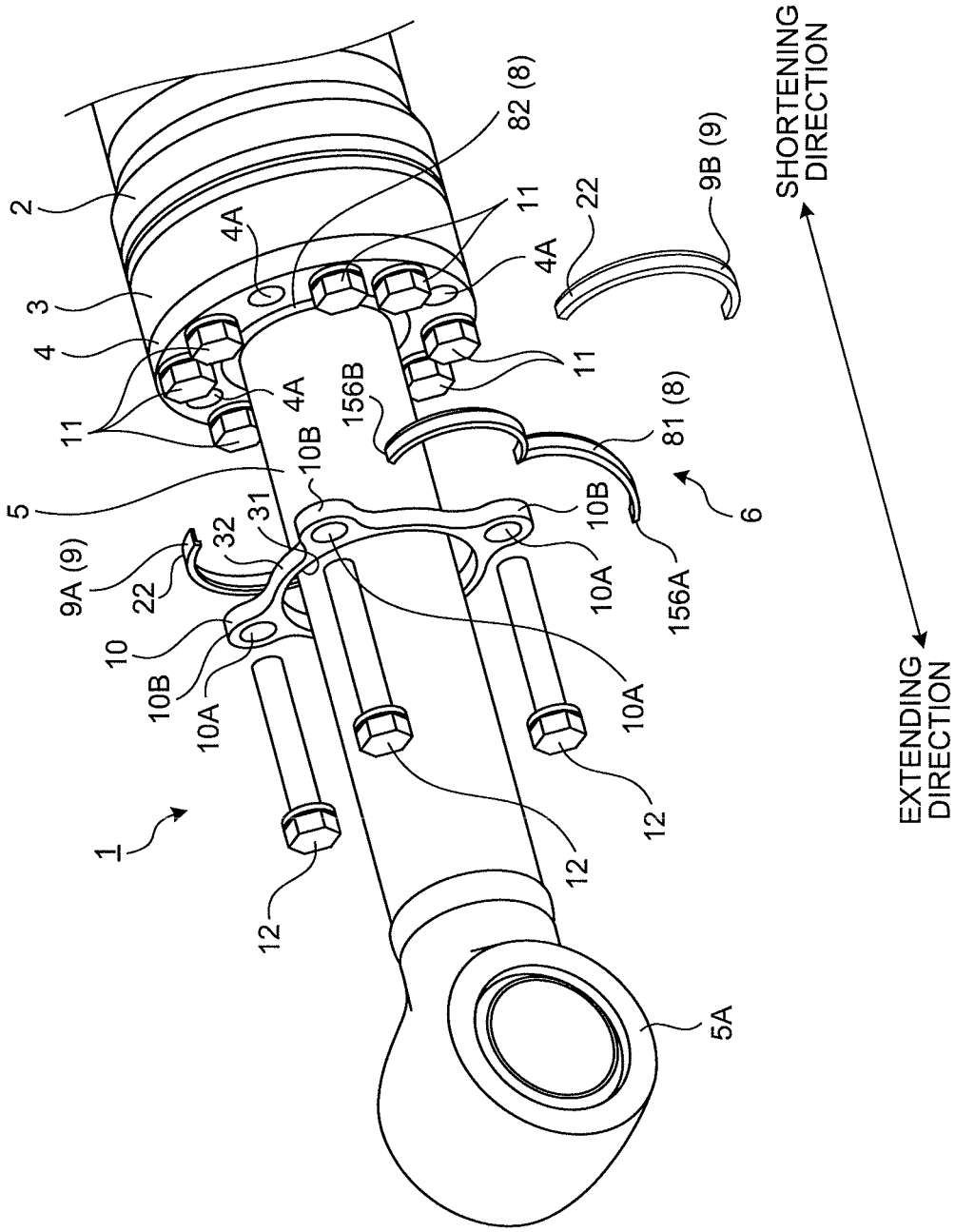
FIG. 2 is an exploded perspective view illustrating a part of the hydraulic cylinder according to the embodiment.

FIG. 1 is a cross-sectional view illustrating a part of a hydraulic cylinder 1 according to the embodiment. FIG. 2 is an exploded perspective view illustrating a part of the hydraulic cylinder 1 according to the embodiment. As illustrated in FIGS. 1 and 2, the hydraulic cylinder 1 includes a cylinder tube 2, a cylinder head 3, a housing 4, a rod 5, and a sealing device 6. The cylinder head 3 is connected to the cylinder tube 2. The housing 4 is connected to the cylinder head 3. The rod 5 is movable with respect to the cylinder tube 2, the cylinder head 3, and the housing 4. The sealing device 6 seals a boundary between at least one of the cylinder head 3 and the housing 4 and the rod 5.

Each of the cylinder tube 2, the cylinder head 3, and the housing 4 is a substantially cylindrical or annular member. The rod 5 is a substantially columnar member. The center axes of the cylinder tube 2, the cylinder head 3, the housing 4, and the rod 5 substantially coincide with each other. In the following description, the center axes of the cylinder tube 2, the cylinder head 3, the housing 4, and the rod 5 are appropriately referred to as a center axis AX collectively.

In addition, in the following description, a direction parallel to the center axis AX is appropriately referred to as an axial direction, a radiation direction of the center axis AX is appropriately referred to as a radial direction, and a rotational direction around the center axis AX is appropriately referred to as a circumferential direction.

The rod 5 moves in the axial direction so as to be withdrawn from the cylinder tube 2 or inserted into the cylinder tube 2. The rod 5 withdrawn from the cylinder tube 2 extends the hydraulic cylinder 1. The rod 5 inserted into the cylinder tube 2 shortens the hydraulic cylinder 1. In the following description, the direction in which the rod 5 moves to extend the hydraulic cylinder 1 is appropriately referred to as an extending direction, and the direction in which the rod 5 moves to shorten the hydraulic cylinder 1 is appropriately referred to as a retracting direction. The extending direction includes a direction in which the rod 5 approaches the cylinder tube 2. The retracting direction includes a direction in which the rod 5 moves away from the cylinder tube 2.

The cylinder tube 2 defines internal space of the hydraulic cylinder 1. The cylinder head 3 is connected to an end surface of the cylinder tube 2 on the side of the extending direction. A bottom (not illustrated) is connected to an end surface of the cylinder tube 2 on the side of the retracting direction. The cylinder tube 2 movably supports a piston (not illustrated) coupled to the other end of the rod 5. The piston partitions the internal space of the cylinder tube 2 into a head chamber and a bottom chamber. Hydraulic oil is supplied to the bottom chamber or the head chamber in response to the extending and retracting operation of the hydraulic cylinder 1.

The cylinder head 3 movably supports the rod 5. The cylinder head 3 is connected to the end surface of the cylinder tube 2 on the side of the extending direction. The cylinder tube 2 and the cylinder head 3 are fixed to each other.

The housing 4 holds at least a part of the sealing device 6. The housing 4 is connected to an end surface of the cylinder head 3 on the side of the extending direction. The housing 4 is detachably connected to the cylinder head 3 with a plurality of bolts 11. The cylinder head 3 and the housing 4 are fixed to each other.

The rod 5 is movable in the axial direction of the center axis AX. The rod 5 is slidably supported on an inner surface of the cylinder head 3. An annular rod head 5A is provided at one end of the rod 5. The rod 5 is to be coupled to working equipment of a construction machine via the rod head 5A.

Sealing Device

The sealing device 6 is a rod sealing device for sealing the boundary between at least one of the inner surface of the cylinder head 3 and an inner surface of the housing 4 and an outer surface of the rod 5. The sealing device 6 prevents foreign substances in the external space of the hydraulic cylinder 1 from entering the internal space of the hydraulic cylinder 1. The sealing device 6 prevents hydraulic oil in the internal space of the hydraulic cylinder 1 from leaking to the external space of the hydraulic cylinder 1.

The sealing device 6 includes a rod seal 7, a dust seal 8, a holding member 9, and a fixing member 10. The holding member 9 is disposed on the outer periphery of the dust seal 8. The fixing member 10 is disposed on the outer periphery of the holding member 9.

The rod seal 7 prevents hydraulic oil in the internal space of the hydraulic cylinder 1 from leaking to the external space of the hydraulic cylinder 1. The rod seal 7 is an annular member. The rod seal 7 is disposed between the inner surface of the cylinder head 3 and the outer surface of the rod 5. The rod seal 7 is held by the cylinder head 3. At least a part of the rod seal 7 contacts the outer surface of the rod 5. In the embodiment, the rod seal 7 includes a rod seal 71 and a rod seal 72, which are disposed in the axial direction. The rod seal 71 is disposed further on the side of the extending direction than the rod seal 72.

The rod seal 7 including the two rod seals 71 and 72 prevents hydraulic oil in the internal space of the hydraulic cylinder 1 from leaking to the external space of the hydraulic cylinder 1. It should be noted that only one rod seal 7 may be provided between the cylinder head 3 and the rod 5 or any number of three or more rod seals may be provided.

The dust seal 8 prevents foreign substances in the external space of the hydraulic cylinder 1 from entering the internal space of the hydraulic cylinder 1. The dust seal 8 is an annular member. The dust seal 8 is disposed on the outer periphery of the rod 5. The dust seal 8 is disposed further on the side of the extending direction than the rod seal 7. The dust seal 8 is disposed on the outer periphery of the rod 5 further on the side of the extending direction than the cylinder head 3. At least a part of the dust seal 8 contacts the outer surface of the rod 5. In the embodiment, the dust seal 8 includes a dust seal 81 and a dust seal 82, which are disposed in the axial direction. The dust seal 81 is disposed further on the side of the extending direction than the dust seal 82.

At least a part of the dust seal 81 is disposed further on the side of the extending direction than the housing 4. The dust seal 81 is disposed between an inner surface of the holding member 9 and the outer surface of the rod 5. The dust seal 81 is held by the holding member 9. The dust seal 82 is disposed between the inner surface of the housing 4 and the outer surface of the rod 5. The dust seal 82 is held by the housing 4.

The dust seal 8 including the two dust seals 81 and 82 prevents foreign substances in the external space of the hydraulic cylinder 1 from entering the internal space of the hydraulic cylinder 1. It should be noted that the dust seal 82 may be omitted or a plurality of dust seals 82 may be provided. For example, one or more dust seals 82 may be provided between the housing 4 and the rod 5, or one or more dust seals may be provided between the cylinder head 3 and the rod 5.

As illustrated in FIG. 2, the dust seal 81 has a pair of first facing surfaces 156A and 156B. The pair of first facing surfaces 156A and 156B is formed by cutting a part of the annular dust seal 81. The annular dust seal 81 is formed by connecting the pair of first facing surfaces 156A and 156B of the dust seal 81 to each other.

The holding member 9 holds the dust seal 81. The holding member 9 is an annular member. The holding member 9 is disposed on the outer periphery of the dust seal 81 further on the side of the extending direction than the housing 4.

The holding member 9 includes a first holding member 9A and a second holding member 9B. The first holding member 9A is disposed on a part of the outer periphery of the dust seal 81. The second holding member 9B is disposed on a part of the outer periphery of the dust seal 81. Each of the first and second holding members 9A and 9B is an arc-shaped member. Each of the first and second holding members 9A and 9B is formed by cutting the annular holding member 9 in half. Cutting the annular holding member 9 in half means cutting the annular holding member 9 in a plane that passes through a center axis of the holding member 9 and that is parallel to the center axis of the holding member 9. The annular holding member 9 is formed by connecting the first and second holding members 9A and 9B to each other. The holding member 9 is made of metal such as brass.

The fixing member 10 holds the dust seal 81 and the holding member 9. The fixing member 10 fixes the dust seal 81 and the holding member 9 to the housing 4. The fixing member 10 is a substantially annular member. The fixing member 10 is disposed on the outer periphery of the holding member 9 further on the side of the extending direction than the housing 4. The fixing member 10 is made of metal such as iron and steel.

The fixing member 10 is connected to an end surface of the housing 4 on the side of the extending direction. The fixing member 10 is detachably connected to the housing 4 with a plurality of bolts 12. That is, the fixing member 10 is detachably connected to the cylinder head 3 via the housing 4 with the bolt 12. The housing 4 and the fixing member 10 are fixed to each other. The dust seal 81 and the holding member 9, which are held by the fixing member 10, are fixed to the housing 4 by fixing the fixing member 10 to the housing 4.

The fixing member 10 includes an inner surface 31, an outer surface 32, a plurality of projections 10B, and holes 10A. The inner surface 31 faces an outer surface 22 of the holding member 9. The projections 10B project from the outer surface 32 to the outside in the radial direction of the center axis AX. The hole 10A is provided in each of the projections 10B. At least a part of a shaft of the bolt 12 is disposed in the hole 10A. A thread ridge is provided at a tip portion of the bolt 12. Holes 4A are provided in the housing 4. Holes (not illustrated) are also provided in the cylinder head 3. Screw holes having a thread groove is provided on the end surface of the cylinder tube 2 on the side of the elongating direction. The tip portion of the bolt 12 is inserted into the screw hole of the cylinder tube 2 via the hole 10A of the fixing member 10, the hole 4A of the housing 4, and the hole of the cylinder head 3. The fixing member 10 is fixed to the housing 4, the cylinder head 3, and the cylinder tube 2 by coupling the thread ridge of the bolt 12 and the thread groove of the screw hole of the cylinder tube 2 to each other. The fixing member 10 is detached from the housing 4 by uncoupling the thread ridge of the bolt 12 and the thread groove of the screw hole of the cylinder tube 2 from each other.

The outer surface 22 of the holding member 9 faces the outside in the radial direction of the center axis AX. The inner surface 31 of the fixing member 10 faces the inside in the radial direction of the center axis AX. The outer surface 32 of the fixing member 10 faces the outside in the radial direction of the center axis AX. The inner surface 31 of the fixing member 10 contacts the outer surface 22 of the holding member 9. The inner surface 31 of the fixing member 10 has a tapered shape in which an inner diameter increases toward the retracting direction. The outer surface 22 of the holding member 9 has a tapered shape in which an outer diameter increases toward the retracting direction.

Dust Seal

FIG. 3 is a plan view illustrating the dust seal 81 according to the embodiment. FIG. 4 is a front view illustrating the dust seal 81 according to the embodiment. FIG. 5 is a cross-sectional view illustrating the dust seal 81 according to the embodiment.

As illustrated in FIGS. 3, 4, and 5, the dust seal 81 includes a seal ring 13 and an outer ring 14. The seal ring 13 and the outer ring 14 are integral with each other.

The seal ring 13 is an annular member. The seal ring 13 is an elastic body. The seal ring 13 is made of rubber. At least one of urethane rubber, nitrile butadiene rubber (NBR), hydrogenated nitrile butadiene rubber (HNBR), silicon rubber, and fluororubber is exemplified as a material for forming the seal ring 13. It should be noted that the seal ring 13 may be made of synthetic resin.

The seal ring 13 has a lip portion 13A and an outer ring portion 13B. At least a part of the lip portion 13A contacts the outer surface of the rod 5. The outer ring portion 13B is disposed further on the outside in the radial direction of the center axis AX than the lip portion 13A. The lip portion 13A extends so as to approach the center axis AX from the outer ring portion 13B toward the side of the elongating direction. Each of the lip portion 13A and the outer ring portion 13B is an elastic body.

The outer ring 14 is an annular member. The outer ring 14 is made of metal. Iron and steel or stainless steel such as a cold rolled steel plate is exemplified as a material for forming the outer ring 14. The outer ring 14 maintains the rigidity and strength of the dust seal 81.

The outer ring 14 has a cylindrical portion 14A and a flange portion 14B. The flange portion 14B is disposed further on the inside in the radial direction of the center axis AX than the cylindrical portion 14A. The flange portion 14B is provided so as to project from an end of the cylindrical portion 14A on the side of the extending direction to the inside in the radial direction. An outer surface 42 (see. FIG. 5) of the cylindrical portion 14A of the outer ring 14 contacts an inner surface 21 (see FIG. 7) of the holding member 9.

At least a part of the outer ring portion 13B is disposed further on the inside in the radial direction than the cylindrical portion 14A. The outer ring 14 is fixed to the outer ring portion 13B. The flange portion 14B is disposed so as to be buried in the outer ring portion 13B. That is, the outer ring portion 13B contains the metal outer ring 14. The outer ring 14 does not exist in the lip portion 13A.

The dust seal 81 includes an inner surface 41, the outer surface 42, an end surface 43, and a tip portion 44. The inner surface 41 faces the outer surface of the rod 5. The outer surface 42 faces a direction opposite to the inner surface 41. The end surface 43 faces the side of the elongating direction. The tip portion 44 contacts the outer surface of the rod 5.

The outer surface 42 of the dust seal 81 faces the outside in the radial direction. The outer surface 42 includes the outer surface of the cylindrical portion 14A and the outer surface of the outer ring portion 13B. The end surface 43 faces the side of the extending direction in the axial direction parallel to the center axis AX. The end surface 43 includes the surface of the outer ring portion 13B. The tip portion 44 is disposed in the lip portion 13A. When the rod 5 moves in the axial direction with respect to the cylinder head 3 and the housing 4, the tip portion 44 of the lip portion 13A slides while maintaining a state of being in close contact with the outer surface of the rod 5.

As illustrated in FIGS. 3 and 4, a part of the dust seal 81 is cut. The dust seal 81 has a pair of first facing surfaces 156A and 156B that face each other. The first facing surface 156A includes a facing surface 15A and a facing surface 16A. The facing surface 15A is formed in the lip portion 13A. The facing surface 16A is formed in the outer ring portion 13B. The first facing surface 156B includes a facing surface 15B and a facing surface 16B. The facing surface 15B is formed in the lip portion 13A. The facing surface 16B is formed in the outer ring portion 13B.

The dust seal 81 has a separation portion 15 and a separation portion 16. The separation portion 15 is formed in the lip portion 13A. The separation portion 16 is formed in the outer ring portion 13B including the outer ring 14.

The separation portion 15 is formed at one location in the circumferential direction of the lip portion 13A. As described above, the lip portion 13A is formed of an elastic body such as rubber. The separation portion 15 is formed by cutting the lip portion 13A with a first tool such as a knife having a small blade thickness. A pair of facing surfaces 15A and 15B that face each other is formed in the lip portion 13A by forming the separation portion 15. A dimension W1 of a gap (cutting margin) of the separation portion 15 is substantially zero. After cutting the lip portion 13A with the first tool, one facing surface 15A and the other facing surface 15B contact each other. It should be noted that, after cutting the lip portion 13A with the first tool, one facing surface 15A and the other facing surface 15B may be separated from each other.

The separation portion 16 is formed at two locations in the circumferential direction of the outer ring portion 13B. The separation portions 16 at the two locations are formed on one line passing through the center axis AX. That is, the separation portions 16 at the two locations are formed at positions that face each other via the center axis AX. As described above, the outer ring portion 13B includes the metal outer ring 14. The separation portion 16 is formed by cutting the outer ring portion 13B containing the outer ring 14 with a second tool such as a grindstone having a large blade thickness. A pair of facing surfaces 16A and 16B that face each other is formed in the outer ring portion 13B containing the outer ring 14 by forming the separation portion 16. After cutting the outer ring portion 13B with the second tool, one facing surface 16A and the other facing surface 16B face each other via a gap. A dimension W2 of the gap of the separation portion 16 is, for example, 1 [mm]. A cutting margin of the dimension W2 is formed since the metal outer ring 14 is cut with the second tool.

The separation portion 15 is formed at substantially the same position as one of the two separation portions 16 in the circumferential direction of the dust seal 81. The first facing surface 156A includes the facing surfaces 15A and 16A that are formed at substantially the same position in the circumferential direction of the dust seal 81. The first facing surface 156B includes the facing surfaces 15B and 16B that are formed at substantially the same position in the circumferential direction of the dust seal 81.

Although the separation portion 16 is formed at two locations, the separation portion 15 is formed at one location. The dust seal 81 is not separated. As illustrated in FIG. 2, the dust seal 81 can be easily deformed while maintaining the arc shape.

Holding Member

Figure 6:
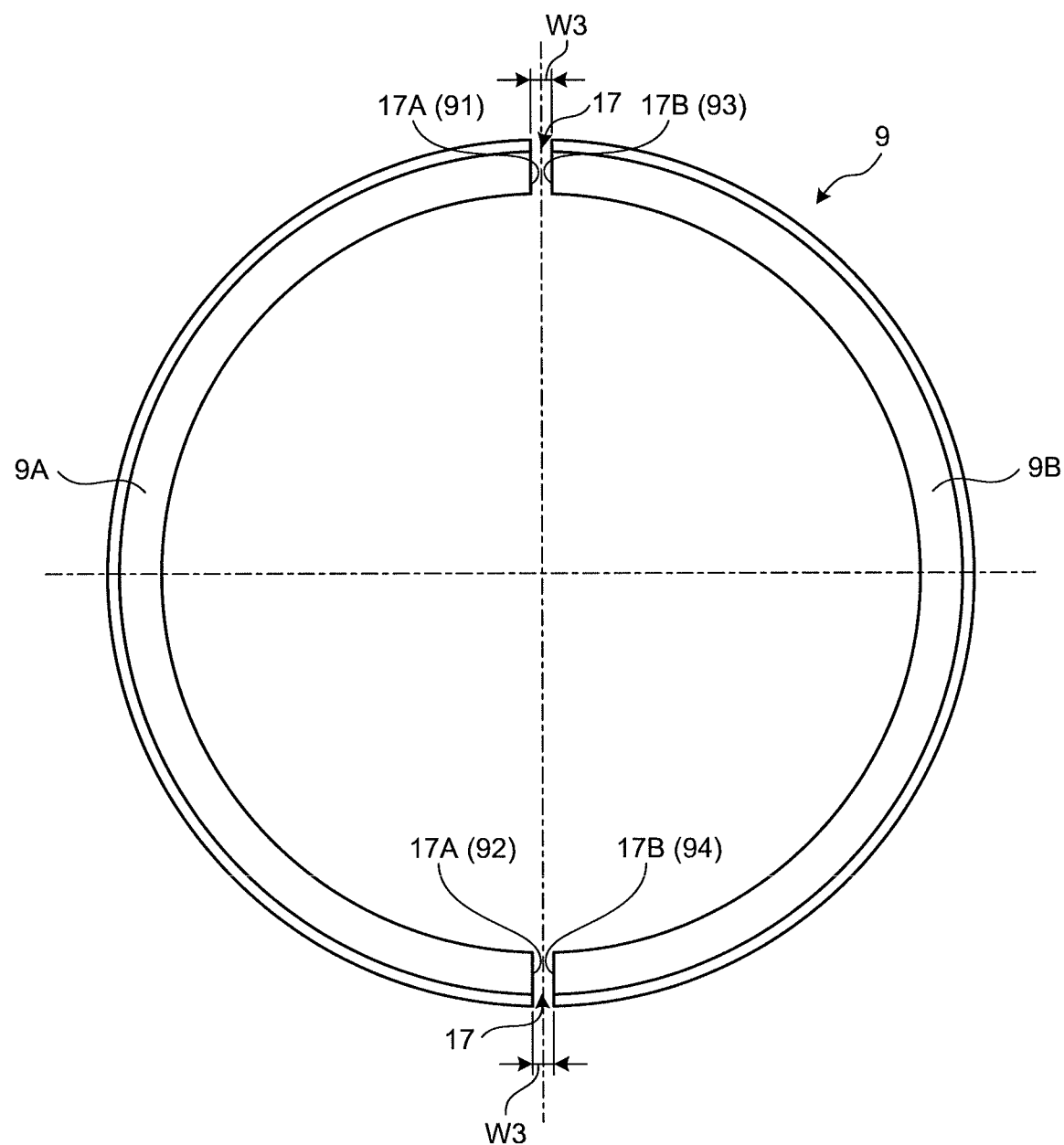
FIG. 6 is a front view illustrating a holding member according to the embodiment.
Figure 7:
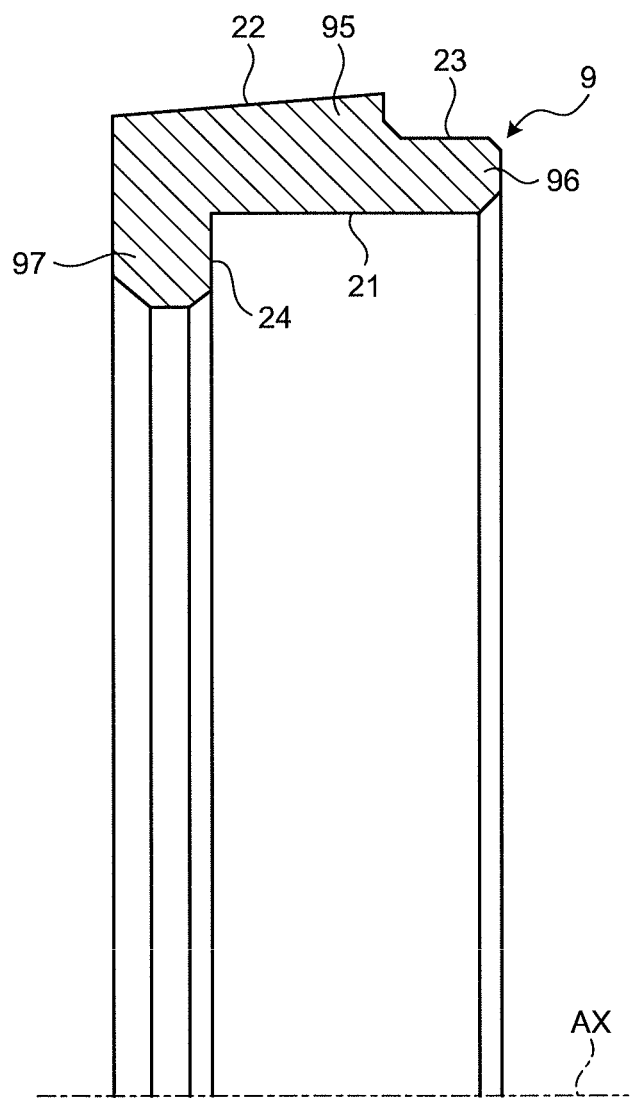
FIG. 7 is a cross-sectional view illustrating the holding member according to the embodiment.

FIG. 6 is a front view illustrating the holding member 9 according to the embodiment. FIG. 7 is a cross-sectional view illustrating the holding member 9 according to the embodiment. The holding member 9 is an annular member. The holding member 9 is made of metal. Brass is exemplified as a material for forming the holding member 9.

As illustrated in FIG. 6, a part of the holding member 9 is cut. The holding member 9 has a separation portion 17. The separation portion 17 is formed at two locations in the circumferential direction of the holding member 9. The separation portions 17 at the two locations are formed on one line passing through the center axis AX. That is, the separation portions 17 at the two locations are formed at positions that face each other via the center axis AX. As described above, the holding member 9 is made of metal such as brass. The separation portion 17 is formed by cutting the holding member 9 with a third tool such as a grindstone. A pair of second facing surfaces 17A and 17B that face each other is formed in the holding member 9 by forming the separation portion 17. After cutting the holding member 9 with the third tool, one second facing surface 17A and the other second facing surface 17B face each other via a gap. A dimension W3 of the gap of the separation portion 17 is, for example, 1 [mm].

The arc-shaped first and second holding members 9A and 9B are formed by cutting the annular holding member 9 at two locations. The outer shape and dimension of the first holding member 9A and those of the second holding member 9B are symmetrical with respect to the cut surface. The first holding member 9A has a first end surface 91 and a second end surface 92. The first end surface 91 is disposed on one side of the first holding member 9A in the circumferential direction of the center axis AX. The second end surface 92 is disposed on the other side of the first holding member 9A in the circumferential direction of the center axis AX. The second holding member 9B has a third end surface 93 and a fourth end surface 94. The third end surface 93 is disposed on one side of the second holding member 9B in the circumferential direction of the center axis AX. The fourth end surface 94 is disposed on the other side of the second holding member 9B in the circumferential direction of the center axis AX. The first and third end surfaces 91 and 93 face each other. The second and fourth end surfaces 92 and 94 face each other.

The pair of second facing surfaces 17A and 17B that face each other includes the first end surface 91 of the first holding member 9A and the third end surface 93 of the second holding member 9B. The pair of second facing surfaces 17A and 17B that face each other includes the second end surface 92 of the first holding member 9A and the fourth end surface 94 of the second holding member 9B.

As illustrated in FIG. 7, the holding member 9 includes a first cylindrical portion 95, a second cylindrical portion 96, and a support portion 97. The first cylindrical portion 95 is disposed on the outer periphery of the dust seal 81. The second cylindrical portion 96 is disposed on the outer periphery of the dust seal 81, and disposed further on the side of the retracting direction than the first cylindrical portion 95. The support portion 97 is disposed further on the side of the extending direction than the outer ring portion 13B of the dust seal 81.

The holding member 9 also has the inner surface 21, the outer surface 22, an outer surface 23, and a support surface 24. The inner surface 21 faces the outer surface 42 of the dust seal 81. The outer surface 22 faces the inner surface 31 of the fixing member 10. The outer surface 23 faces the inner surface of the housing 4. The support surface 24 faces the end surface 43 on the side of the extending direction of the dust seal 81.

The holding member 9 has the tapered outer surface 22 facing the inner surface 31 of the fixing member 10, and the outer diameter of the outer surface 22 increases toward the side of the retracting direction.

The outer diameter of the outer surface 23, which faces the inner surface of the housing 4, of the holding member 9 is smaller than the outer diameter of the outer surface 22. The outer surface 23 is disposed in the second cylindrical portion 96. The second cylindrical portion 96 can fit the inside of the housing 4. The outer surface 22 is disposed in the first cylindrical portion 95. The first cylindrical portion 95 is disposed further on the side of the extending direction than the housing 4 with the second cylindrical portion 96 fitting the inside of the housing 4.

Method of Replacement

Figure 8:
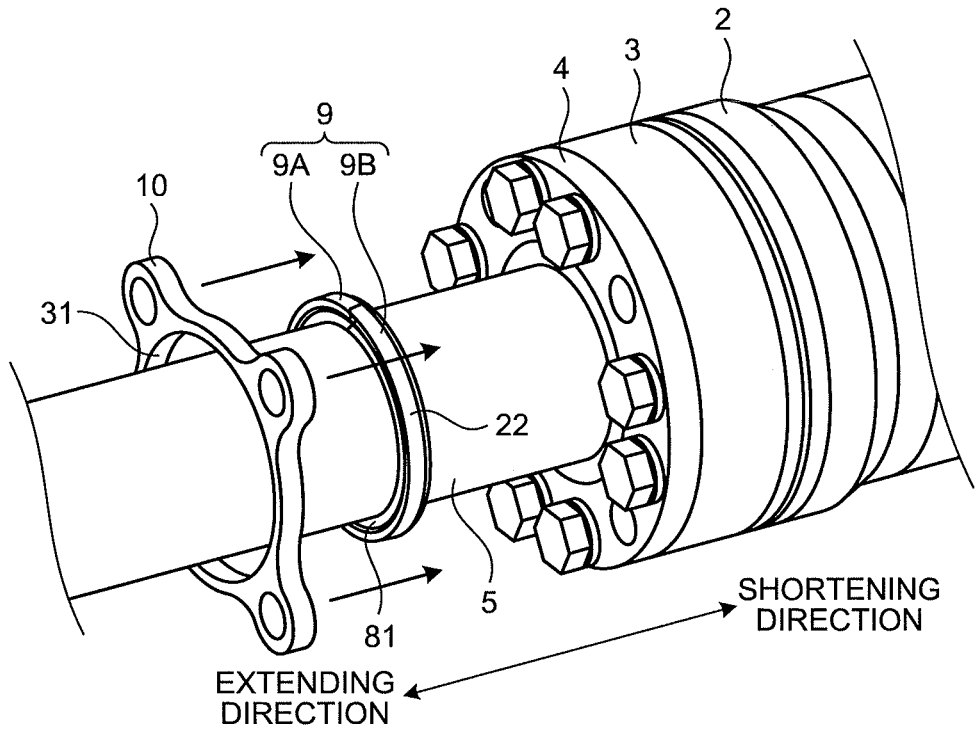
FIG. 8 illustrates a method of replacing a sealing device according to the embodiment.

A method of replacing the sealing device 6 will now be described. Each of FIGS. 8, 9, and 10 illustrates a method of replacing the sealing device 6 according to the embodiment.

First, a method of attaching the dust seal 81 to the hydraulic cylinder 1 will be described. As illustrated in FIG. 8, the dust seal 81 is disposed on the outer periphery of the rod 5, and the holding member 9 is disposed on the outer periphery of the dust seal 81. A worker places the dust seal 81 having the pair of first facing surfaces 156A and 156B provided in the lip portion 13A on the outer periphery of the rod 5 further on the side of the extending direction than the cylinder head 3 and the housing 4 such that the pair of first facing surfaces 156A and 156B faces each other. The dust seal 81 has separation portions 15 and 16 that are provided at substantially the same position in the circumferential direction. The worker can thus easily dispose the dust seal 81 on the outer periphery of the rod 5 with the hydraulic cylinder 1 being mounted in the construction machine and at least a part of the rod 5 being inserted into the cylinder tube 2.

After disposing the dust seal 81 on the outer periphery of the rod 5, the worker disposes the holding member 9 on the outer periphery of the dust seal 81 with the hydraulic cylinder 1 being mounted in the construction machine and at least a part of the rod 5 being inserted into the cylinder tube 2. The large rod head 5A prevents an annular and integral member from being attached or detached as it is. The worker disposes the first and second holding members 9A and 9B on the outer periphery of the dust seal 81 such that the first end surface 91 of the first holding member 9A and the third end surface 93 of the second holding member 9B face each other and the second end surface 92 of the first holding member 9A and the fourth end surface 94 of the second holding member 9B face each other. The holding member 9 is divided into the first holding member 9A and the second holding member 9B. The worker can thus easily dispose the holding member 9 on the outer periphery of the dust seal 81 with at least a part of the rod 5 being inserted into the cylinder tube 2.

Figure 9:
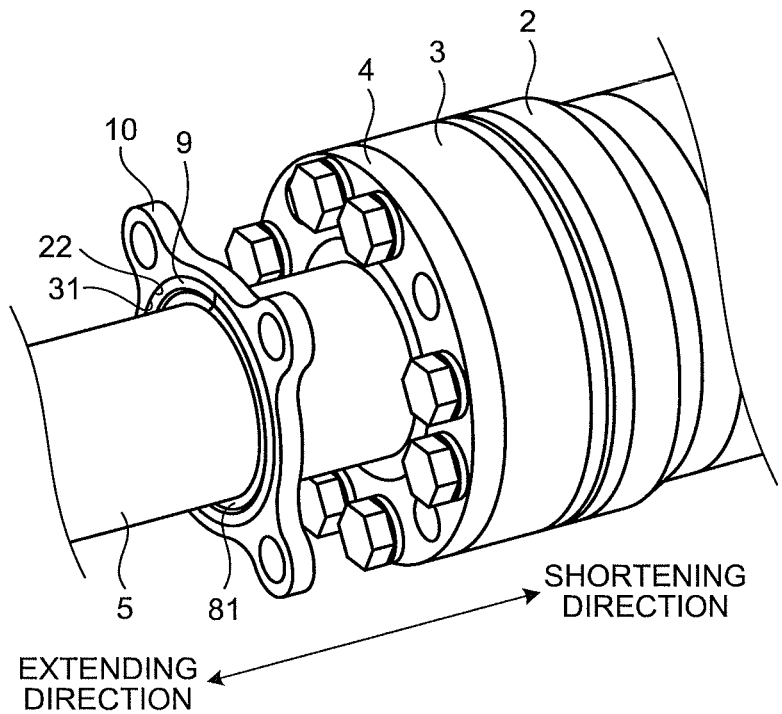
FIG. 9 illustrates the method of replacing the sealing device according to the embodiment.
Figure 10:
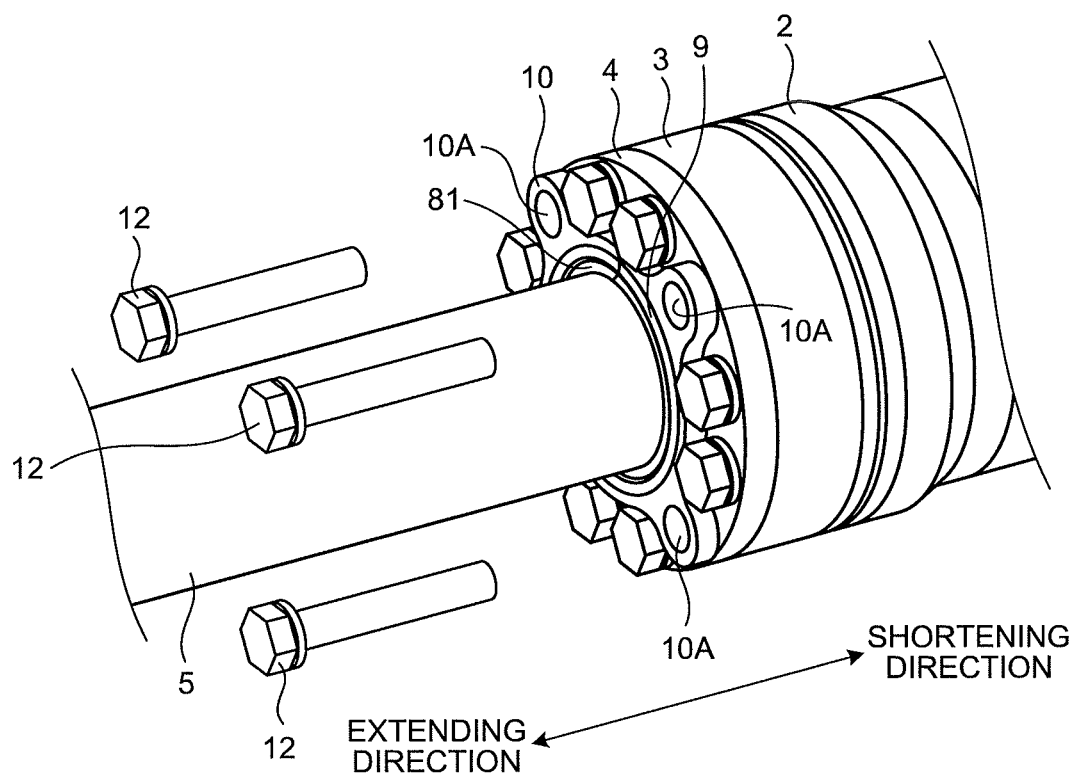
FIG. 10 illustrates the method of replacing the sealing device according to the embodiment.

As illustrated in FIG. 9, the fixing member 10 is then disposed on the outer periphery of the holding member 9. The fixing member 10 is disposed in advance on the outer periphery of the rod 5 further on the side of the extending direction than the dust seal 81 and the holding member 9. The worker moves the fixing member 10 toward the side of the retracting direction with respect to the holding member 9 and the dust seal 81. This operation causes the holding member 9 to be disposed inside the fixing member 10, and the inner surface 31 of the fixing member 10 and the outer surface 22 of the holding member 9 to contact each other.

As illustrated in FIG. 10, the fixing member 10 is fixed to the housing 4 with the bolt 12. After inserting the tip portion of the bolt 12 into the screw hole of the cylinder tube 2 via a hole 10A of the fixing member 10, a hole 4A of the housing 4, and the hole of the cylinder head 3, the worker operates the bolt 12 so that the thread ridge of the tip portion of the bolt 12 and the thread groove of the screw hole of the cylinder tube 2 are coupled with each other. This operation fixes the fixing member 10 to the housing 4.

Figure 11:
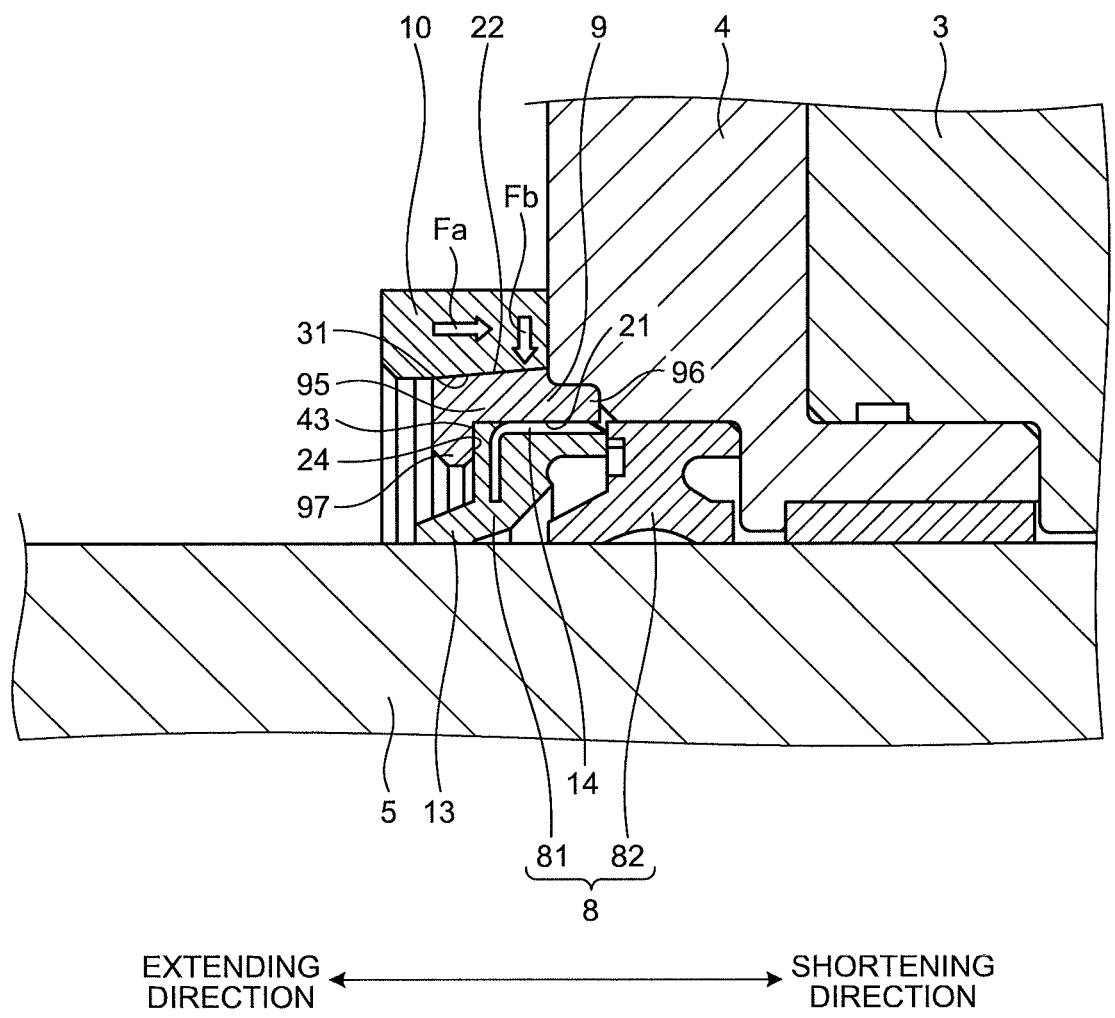
FIG. 11 is a cross-sectional view schematically illustrating a part of the sealing device according to the embodiment.
Figure 12:
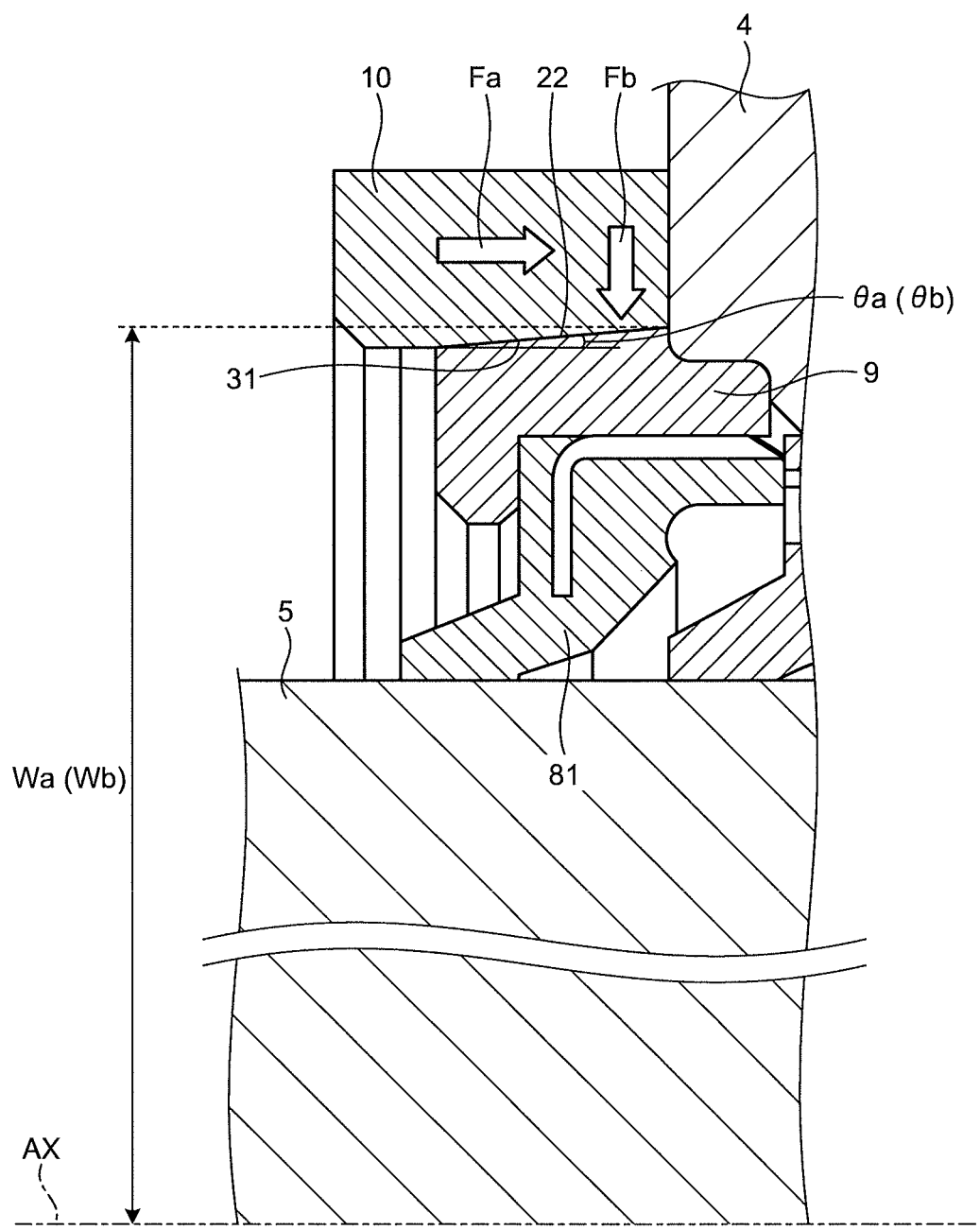
FIG. 12 is an enlarged cross-sectional view of a part of the sealing device according to the embodiment.

FIG. 11 is a cross-sectional view schematically illustrating a part of the sealing device 6 according to the embodiment. FIG. 12 is an enlarged cross-sectional view of a part of the sealing device 6 according to the embodiment.

A taper angle θa of the outer surface 22 of the holding member 9 is substantially the same as a taper angle θb of the inner surface 31 of the fixing member 10. It should be noted that the taper angle θa may be larger or smaller than the taper angle θb. The taper angle θa means a measure of an interior angle formed by a virtual line parallel to the center axis AX and the outer surface 22. The taper angle θb means a measure of an exterior angle formed by the virtual line parallel to the center axis AX and the inner surface 31.

An outer diameter Wa of the outer surface 22 of the holding member 9 is substantially the same as an inner diameter Wb of the inner surface 31 of the fixing member 10. It should be noted that the outer diameter Wa may be slightly larger than the inner diameter Wb. The outer diameter Wa means the maximum value of the outer diameter of the outer surface 22. The inner diameter Wb means the maximum value of the inner diameter of the inner surface 31.

Fastening the bolt 12 causes the bolt 12 to generate fastening force Fa in the axial direction. The fastening force Fa fixes the fixing member 10 to the housing 4. In the embodiment, the fixing member 10 has the tapered inner surface 31, which contacts the outer surface 22 of the holding member 9 and has an inner diameter increasing toward the side of the retracting direction. Consequently, at least a part of the fastening force Fa generates component force Fb toward the inside in the radial direction by moving the fixing member 10 toward the side of the retracting direction with respect to the holding member 9 and then fastening the fixing member 10 with the bolt 12 so that the fixing member 10 is fixed to the housing 4 with the inner surface 31 of the fixing member 10 and the outer surface 22 of the holding member 9 being in contact with each other. The component force Fb includes tension force indicating force with which the tip portion 44 of the dust seal 81 fastens the rod 5. The fixing member 10, which has the tapered inner surface 31 whose inner diameter increases toward the side of the retracting direction, can apply the component force Fb toward the inside in the radial direction to each of the holding member 9 and the dust seal 81 by being moved toward the side of the retracting direction with respect to the holding member 9 and the dust seal 81 with the inner surface 31 and the outer surface 22 of the holding member 9 being in contact with each other. The component force Fb applied to the dust seal 81 brings the pair of first facing surfaces 156A and 156B of the dust seal 81 into close contact with each other. In addition, the component force Fb applied to the holding member 9 brings the pair of second facing surfaces 17A and 17B of the holding member 9 into close contact with each other. In such a manner, the fixing member 10 can apply the component force Fb to the dust seal 81 via the holding member 9 so that the pair of first facing surfaces 156A and 156B is brought into close contact with each other. The fixing member 10 can also apply the component force Fb to the holding member 9 so that the pair of second facing surfaces 17A and 17B is brought into close contact with each other. The pair of first facing surfaces 156A and 156B is brought into close contact with each other with the fixing member 10 being disposed around the holding member 9. The pair of second facing surfaces 17A and 17B is brought into close contact with each other with the fixing member 10 being disposed around the holding member 9.

The fixing member 10 has the tapered inner surface 31 whose inner diameter increases toward the side of the retracting direction. This configuration prevents the holding member 9 and the dust seal 81 from moving toward the side of the extending direction with respect to the fixing member 10 fixed to the housing 4. In addition, both of the inner surface 31 of the fixing member 10 and the outer surface 22 of the holding member 9 are tapered, so that the contact area between the inner surface 31 and the outer surface 22 is increased. The fixing member 10 thus stably fixes the holding member 9.

As illustrated in FIG. 11, the second cylindrical portion 96 of the holding member 9 fits the inside the housing 4. In addition, the end surface 43 of the dust seal 81 and the support surface 24 of the holding member 9 contact each other. This configuration fixes relative positions of the housing 4 and the holding member 9, and prevents the dust seal 81 from moving in the axial direction.

Each of FIGS. 13 and 14 is a front view illustrating parts of the dust seal 81 and the holding member 9 according to the embodiment. FIG. 13 illustrates the holding member 9 and the dust seal 81 before applying the component force Fb thereto. FIG. 14 illustrates the holding member 9 and the dust seal 81 after applying the component force Fb thereto.

As illustrated in FIG. 13, one facing surface 16A and the other facing surface 16B of the outer ring portion 13B face each other via a gap, and one second facing surface 17A and the other second facing surface 17B of the holding member 9 face each other via the gap, before applying the component force Fb to the holding member 9 and the dust seal 81.

As illustrated in FIG. 14, the component force Fb applied to the holding member 9 and the dust seal 81 brings the pair of first facing surfaces 156A and 156B of the dust seal 81 into close contact with each other, and brings the pair of second facing surfaces 17A and 17B of the holding member 9 into close contact with each other. This configuration prevents foreign substances in the external space of the hydraulic cylinder 1 from entering the internal space of the hydraulic cylinder 1.

A method of detaching the dust seal 81 from the hydraulic cylinder 1 will now be described. The worker operates the bolt 12 to detach the bolt 12 from the housing 4. The fixing member 10 and the housing 4 are unfixed from each other by detaching the bolt 12 from the housing 4. The worker moves the fixing member 10 toward the side of the extending direction with respect to the holding member 9 and the dust seal 8. This operation causes the holding member 9 and the dust seal 81 to be detached from the fixing member 10.

Effect

As described above, according to the embodiment, a part of the annular dust seal 81 is cut so that the pair of first facing surfaces 156A and 156B, which face each other, is formed. This configuration enables the worker to easily perform an operation of disposing the dust seal 81 on the outer periphery of the rod 5 and an operation of detaching the dust seal 81 from the rod 5, further on the side of the extending direction than the cylinder head 3 and the housing 4 with the rod 5 being inserted into the cylinder tube 2.

When the dust seal 81 does not have the first facing surfaces 156A and 156B, removal of hydraulic oil from the internal space of the hydraulic cylinder 1 and withdrawal of the entire rod 5 from the cylinder tube 2 are required in order to dispose the annular dust seal 81 on the outer periphery of the rod 5 or detach the annular dust seal 81 from the rod 5. In such a case, long time is needed for operation of replacing the dust seal 81.

In the embodiment, a part of the annular dust seal 81 is cut. This configuration enables the operation of disposing the dust seal 81 on the outer periphery of the rod 5 and the operation of detaching the dust seal 81 from the rod 5 to be easily performed without withdrawing the rod 5 from the cylinder tube 2. This configuration prevents time needed for operation of replacing the dust seal 81 from becoming longer.

In the case where the metal outer ring 14 is provided on the dust seal 81, the dimension W2 of the separation portion 16 may be increased when a part of the dust seal 81 is cut. In the embodiment, the fixing member 10 having the tapered inner surface 31 holds the dust seal 81 via the holding member 9. The fixing member 10 can apply the component force Fb to the dust seal 81 via the holding member 9 so that the one facing surface 16A and the other facing surface 16B are brought into close contact with each other. As a result, the fixing member 10 brings one facing surface 16A and the other facing surface 16B into close contact with each other even when the separation portion 16 having the dimension W2 is formed. The dust seal 81 thus can exhibit a good sealing function.

In the embodiment, the holding member 9 is provided between the fixing member 10 and the dust seal 81. Workability in mounting the dust seal 81 on the rod 5 is improved by providing the holding member 9. The dust seal 81 is easy to be deformed. The worker may have difficulty in smoothly performing an operation of directly mounting the dust seal 81, which is easy to be deformed, to the fixing member 10. The worker can mount the dust seal 81 to the fixing member 10 with good workability by causing the holding member 9 to hold the dust seal 81, which is easy to be deformed, and then causing the fixing member 10 to hold the holding member 9.

In the embodiment, the outer surface 22 of the holding member 9 has a tapered shape in which an outer diameter increases toward the side of the retracting direction. Both of the inner surface 31 of the fixing member 10 and the outer surface 22 of the holding member 9 are tapered, so that the contact area between the inner surface 31 and the outer surface 22 is increased. The fixing member 10 thus stably fixes the holding member 9.

In the embodiment, the fixing member 10 is made of, for example, iron and steel, and the holding member 9 is made of, for example, brass. The holding member 9 is formed of a material easier to be deformed than the fixing member 10. When the holding member 9 is inserted inside the fixing member 10, the holding member 9 is thus slightly deformed. The fixing member 10 thus stably fixes the holding member 9.

In the embodiment, the holding member 9 is divided into the first holding member 9A and the second holding member 9B. This configuration enables the worker to easily perform an operation of disposing the holding member 9 on the outer periphery of the dust seal 81 and an operation of detaching the holding member 9 from the dust seal 81 without withdrawing the rod 5 from the cylinder tube 2. This configuration prevents time needed for operation of replacing the dust seal 81 from becoming longer.

The holding member 9 is made of metal. When a part of the holding member 9 is cut to divide the holding member 9 into the first holding member 9A and the second holding member 9B, the dimension W3 of the separation portion 17 may be increased. In the embodiment, the fixing member 10 having the tapered inner surface 31 holds the holding member 9. The fixing member 10 can apply the component force Fb to the holding member 9 so that the one second facing surface 17A and the other second facing surface 17B are brought into close contact with each other. As a result, the fixing member 10 brings one second facing surface 17A and the other second facing surface 17B into close contact with each other even when the separation portion 17 having the dimension W3 is formed. The holding member 9 can thus exhibit a good sealing function.

The fixing member 10 is detachably fixed to the housing 4 and the cylinder head 3 with the bolt 12. Operations of fixing and detaching the fixing member 10 to/from the housing 4 can be performed only by operating the bolt 12. This configuration prevents time needed for operation of replacing the dust seal 81 from becoming longer.

Another Embodiment

In the above-described embodiment, the separation portion 15 is formed at one location of the lip portion 13A, the separation portion 16 is formed at two locations of the outer ring portion 13B, and the dust seal 81 is not divided. The dust seal 81 may be divided. For example, the separation portions 15 and 16 may be formed at each of two identical positions in the circumferential direction of the dust seal 81.

In the above-described embodiment, the separation portion 17 is provided at two locations, and the holding member 9 is divided into the first holding member 9A and the second holding member 9B. The separation portion 17 may be provided at one location. In the case where the holding member 9 is deformable, the worker can smoothly perform an operation of disposing the holding member 9 on the outer periphery of the rod 5 and an operation of detaching the holding member 9 from the rod 5 even when the separation portion 17 is provided at one location.

It should be noted that the separation portion 17 is not required to be formed in the holding member 9. That is, the holding member 9 may maintain the annular shape. The holding member 9 is not required to be replaced in the operation of replacing the dust seal 81. The holding member 9 may be kept disposed on the outer periphery of the rod 5 even in the operation of replacing the dust seal 81.

In the above-described embodiment, the outer surface 22 of the holding member 9 has a tapered shape in which an outer diameter increases toward the side of the retracting direction. The outer surface 22 of the holding member 9 is not required to be tapered, but may be, for example, parallel to the center axis AX.

FIG. 15 is an enlarged cross-sectional view of a part of a sealing device 6 according to another embodiment. In the above-described embodiment, the dust seal 81 is uniformly mounted on the fixing member 10 via the holding member 9. As illustrated in FIG. 15, the holding member 9 may be omitted. That is, the dust seal 81 may be directly mounted on the fixing member 10. In addition, the holding member 9 may be integral with the fixing member 10. When the holding member 9 is omitted or integral with the fixing member 10, the fixing member 10 functions as a holding member that is detachably connected to a cylinder head 3 via a housing 4 and that holds the dust seal 81 so that a pair of first facing surfaces 156A and 156B that face each other is brought into close contact with each other. The fixing member 10 is detachably connected to the cylinder head 3 via the housing 4 with a bolt 12. The fixing member 10 is disposed on the outer periphery of the dust seal 81. The fixing member 10 has a tapered inner surface 31 that contacts an outer surface 42 of the dust seal 81 and has an inner diameter increasing toward the side of the retracting direction. The fixing member 10 can apply component force Fb to the dust seal 81 so that the pair of first facing surfaces 156A and 156B that face each other is brought into close contact with each other by being moved toward the side of the retracting direction with respect to the dust seal 81 with the inner surface 31 and the outer surface 42 of the dust seal 81 being in contact with each other. The close contact between the first facing surfaces 156A and 156B causes the dust seal 81 to exhibit a good sealing function. When the dust seal 81 is directly mounted on the fixing member 10, the dust seal 81 may have the tapered outer surface 42 whose outer diameter increases toward the side of the retracting direction. It should be noted that the outer surface 42 of the dust seal 81 is not required to be tapered, but may be, for example, parallel to a center axis AX.

In the above-described embodiment, the cylinder head 3 and the housing 4 may be integral with each other. The housing 4 may be regarded as a part of the cylinder head 3.

In the above-described embodiment, the separation portion 15 is formed by cutting the lip portion 13A with the first tool such as a utility knife. The separation portion 15 may be formed without using the first tool. The separation portion 15 may be formed in advance, for example, in manufacturing the dust seal 81.

In the above-described embodiment, the separation portion 16 is formed by cutting the outer ring portion 13B including the outer ring 14 with the second tool such as a grindstone. The separation portion 16 may be formed without using the second tool. The separation portion 16 may be formed in advance, for example, in manufacturing the dust seal 81.

In the above-described embodiment, the arc-shaped first and second holding members 9A and 9B are formed by cutting the annular holding member 9 at two locations. The first and second holding members 9A and 9B may be formed without cutting the annular holding member 9 at two locations. For example, each of the arc-shaped first and second holding members 9A and 9B may be manufactured.

In the above-described embodiment, the dust seal 8 has the pair of first facing surfaces 156A and 156B that face each other, and the holding member 9 is disposed around the dust seal 8. A rod seal 7 may have the pair of first facing surfaces 156A and 156B that face each other, and the holding member 9 may be disposed around the rod seal 7. That is, the components described in the above-described embodiment may be applied to the dust seal 8 or the rod seal 7.

What is claimed is:

1. A sealing device comprising:
   an annular seal that is disposed on an outer periphery of a rod of a hydraulic cylinder further on a side of an extending direction than a cylinder head of the hydraulic cylinder and that has a pair of opposing first facing surfaces;
   a holding member disposed on an outer periphery of the seal; and
   a fixing member disposed on an outer periphery of the holding member, the fixing member having a tapered inner surface that contacts an outer surface of the holding member and that has an inner diameter increasing toward a retracting direction.

2. The sealing device according to claim 1, wherein the pair of first facing surfaces comes in close contact with each other with the fixing member being disposed on the outer periphery of the holding member.

3. The sealing device according to claim 1, wherein the outer surface of the holding member has a tapered shape in which an outer diameter increases toward the retracting direction.

4. The sealing device according to claim 1, wherein the holding member has a pair of opposing second facing surfaces.

5. The sealing device according to claim 4, wherein the pair of second facing surfaces comes in close contact with each other with the fixing member being disposed on the outer periphery of the holding member.

6. The sealing device according to claim 4, wherein the holding member includes: a first holding member that is disposed on a part of an outer periphery of the seal and that has a first end surface and a second end surface; and a second holding member that is disposed on a part of the outer periphery of the seal and that has a third end surface and a fourth end surface, the third end surface facing the first end surface, the fourth end surface facing the second end surface,
   the pair of second facing surfaces has each of the first and third end surfaces and the second and fourth end surfaces.

7. The sealing device according to claim 1,
wherein the fixing member is detachably connected to the cylinder head with a bolt.

8. The sealing device according to claim 1,
wherein the seal includes: a lip portion that contacts an outer surface of the rod; and an outer ring portion disposed further on an outside in a radial direction of a center axis of the rod than the lip portion, and
the first facing surfaces include; a facing surface formed in the lip portion; and a facing surface formed in the outer ring portion.

9. A sealing device comprising:
a seal that is disposed on an outer periphery of a rod of a hydraulic cylinder further on a side of an extending direction than a cylinder head of the hydraulic cylinder and that has a pair of opposing first facing surfaces; and
a holding member disposed on an outer periphery of the seal, the holding member having a tapered inner surface that contacts a whole surface of an outer surface of the seal and that has an inner diameter increasing toward a retracting direction, the inner surface being made of metal.

10. The sealing device according to claim 9,
wherein the pair of first facing surfaces comes in close contact with each other with the holding member being disposed around the seal.

11. The sealing device according to claim 9,
wherein the outer surface of the seal has a tapered shape in which an outer diameter increases toward the retracting direction.

12. The sealing device according to claim 9,
wherein the holding member is detachably connected to the cylinder head with a bolt.

13. The sealing device according to claim 9,
wherein the seal includes: a lip portion that contacts an outer surface of the rod; and an outer ring portion disposed further on an outside in a radial direction of a center axis of the rod than the lip portion, and
the first facing surfaces include; a facing surface formed in the lip portion; and a facing surface formed in the outer ring portion.

14. A sealing device comprising:
a seal that is disposed on an outer periphery of a rod of a hydraulic cylinder further on a side of an extending direction than a cylinder head of the hydraulic cylinder and that has a pair of opposing first facing surfaces; and
a holding member that is detachably connected to the cylinder head and that holds the seal such that the pair of first facing surfaces comes in close contact with each other,
wherein the holding member has a tapered inner surface that contacts a whole surface of an outer surface of the seal and that has an inner diameter increasing toward a retracting direction, the inner surface being made of metal.

15. The sealing device according to claim 14,
wherein the holding member includes: a first holding member that is disposed on an outer periphery of the seal and that holds the seal; and a second holding member that is disposed on an outer periphery of the first holding member.

16. The sealing device according to claim 15,
wherein the pair of first facing surfaces comes in close contact with each other with the holding member being disposed around the seal.

17. The sealing device according to claim 14,
wherein the seal includes: a lip portion that contacts an outer surface of the rod; and an outer ring portion disposed further on an outside in a radial direction of a center axis of the rod than the lip portion, and
the first facing surfaces include; a facing surface formed in the lip portion; and a facing surface formed in the outer ring portion.

18. The sealing device according to claim 17,
wherein each of the lip portion and the outer ring portion is an elastic body, and
the seal includes a metal outer ring fixed to the outer ring portion.

* * * * *